(12) United States Patent
Chung et al.

(10) Patent No.: US 9,230,286 B2
(45) Date of Patent: *Jan. 5, 2016

(54) METHODS AND SYSTEMS FOR ASSOCIATING USERS THROUGH NETWORK SOCIETIES

(75) Inventors: Shen-Ming Chung, Chiayi County (TW); Fang-Jung Hsu, Hsinshu (TW)

(73) Assignee: Industrial Technology Research Institute, Hsinchu (TW)

( * ) Notice: Subject to any disclaimer, the term of this patent is extended or adjusted under 35 U.S.C. 154(b) by 18 days.

This patent is subject to a terminal disclaimer.

(21) Appl. No.: 13/470,948

(22) Filed: May 14, 2012

(65) Prior Publication Data

US 2012/0284335 A1  Nov. 8, 2012

Related U.S. Application Data

(63) Continuation-in-part of application No. 12/048,345, filed on Mar. 14, 2008, now Pat. No. 8,200,819.

(51) Int. Cl.

| G06F 15/173 | (2006.01) |
|---|---|
| G06Q 50/00 | (2012.01) |
| H04L 29/06 | (2006.01) |
| H04W 4/08 | (2009.01) |
| H04W 12/02 | (2009.01) |
| H04W 8/18 | (2009.01) |
| H04W 8/20 | (2009.01) |
| H04L 29/08 | (2006.01) |

(52) U.S. Cl.
CPC ............ *G06Q 50/01* (2013.01); *H04L 63/0414* (2013.01); *H04L 67/12* (2013.01); *H04W 4/08* (2013.01); *H04W 12/02* (2013.01); *H04L 63/18* (2013.01); *H04L 67/30* (2013.01); *H04W 8/186* (2013.01); *H04W 8/20* (2013.01)

(58) Field of Classification Search
CPC .............. H04L 51/32; H04L 29/06319; H04L 29/06326; H04L 63/18; H04L 63/068; H04L 63/12; H04L 67/12; H04L 67/30
USPC .................................. 709/204–206, 227–228
See application file for complete search history.

(56) References Cited

U.S. PATENT DOCUMENTS 7,305,681 B2 * 12/2007 Khartabil ...................... 719/328
8,320,384 B2 * 11/2012 Oouchi et al. ............ 370/395.31

(Continued)

OTHER PUBLICATIONS

J. Rosenberg, RFC 3261, SIP: Session Initiation Protocol, Jun. 2002.*

(Continued)

*Primary Examiner* — Joshua Joo
(74) *Attorney, Agent, or Firm* — Finnegan, Hendersn, Farabow, Garrett & Dunner LLP

(57) ABSTRACT

A method is provided for associating a first user using a first device and a second user using a second device. The method may include receiving an invitation request from the first user; verifying, by a verification server, the invitation request; sending an invitation to the second user after verifying the invitation request; and receiving an acknowledgement from the second user to acknowledge an association between the first user and the second user. The invitation request may be identified as directed to the second user and may include at least a device token associated with at least one of the first and second devices and an identification associated with at least one of the second device and the second user.

11 Claims, 17 Drawing Sheets

(56) References Cited

U.S. PATENT DOCUMENTS

| | | | |
|---|---|---|---|
| 8,584,258 B2* | 11/2013 | La Rotonda | G06Q 10/10 709/203 |
| 8,812,482 B1* | 8/2014 | Kapoor et al. | 707/713 |
| 2003/0204734 A1* | 10/2003 | Wheeler | H04L 9/0844 713/184 |
| 2004/0047339 A1* | 3/2004 | Wang et al. | 370/352 |
| 2005/0135388 A1* | 6/2005 | Hartikainen et al. | 370/401 |
| 2005/0232210 A1* | 10/2005 | Karaoguz et al. | 370/338 |
| 2005/0262575 A1* | 11/2005 | Dweck et al. | 726/28 |
| 2006/0234631 A1* | 10/2006 | Dieguez | 455/41.2 |
| 2007/0002832 A1* | 1/2007 | Sylvain | 370/352 |
| 2007/0150723 A1* | 6/2007 | Estable et al. | 713/155 |
| 2008/0031230 A1* | 2/2008 | Kacher et al. | 370/352 |
| 2008/0137828 A1* | 6/2008 | Chmaytelli | 379/142.01 |
| 2008/0186926 A1* | 8/2008 | Baio et al. | 370/338 |
| 2008/0219452 A1* | 9/2008 | Lu | H04L 9/0891 380/283 |
| 2008/0254792 A1* | 10/2008 | Ch'ng | H04L 63/101 455/435.1 |
| 2009/0227206 A1* | 9/2009 | Tada et al. | 455/41.2 |
| 2009/0234910 A1 | 9/2009 | Chung et al. | |
| 2010/0274859 A1* | 10/2010 | Bucuk | 709/206 |

OTHER PUBLICATIONS

M. Handley, RFC 2543, SIP: Session Initiation Protocol, Mar. 1999.*
Humphreys, "Mobile Social Networks and Urban Public Space", New Media Society OnlineFirst, Published on Feb. 9, 2010 as doi:10.1177/1461444809349578, pp. 1-16.

* cited by examiner

| Acknowledge Index | In Use | Inviter NID | Inviter Token | Invitee IP Address | Invitee Public Key | Society ID |
|---|---|---|---|---|---|---|
| 0 | NO | X | X | X | X | X |
| 1 | NO | X | X | X | X | X |
| 53025 | YES | 2 | Joseph | 140.96.194.35 | Key$_C$ | 786 |
| 53026 | YES | 1202 | Ken | 140.93.35.73 | Key$_D$ | 786 |

FIG. 8

| Invitee Table(6502₁) | |
|---|---|
| Invitee NID | |
| 2530 | |
| 5401 | |
| 1201 | |

FIG. 13

METHODS AND SYSTEMS FOR ASSOCIATING USERS THROUGH NETWORK SOCIETIES

RELATED APPLICATION

The application is a continuation-in-part application of and claims the benefits of priority from application Ser. No. 12/048,345, filed Mar. 14, 2008, now U.S. Pat. No. 8,200,819 titled "Method and Apparatuses for Network Society Associating."

TECHNICAL FIELD

The disclosed embodiments relate to methods and systems for associating users through one or more network societies.

BACKGROUND

Network societies have been emerging quickly with the widespread use of Internet, especially with the increasing accessibility through various portable communication devices, including smart phones. Network societies typically have at least one network server that manages the relationships among the members of each society. An example of a network server is a social network server (SNS), with the network consisting of its members that manages the relationships among those members. Such a network is sometimes known as a "social network."

Each person may be considered as a node in a social network, and each node may have associations with other node(s) in the social network. An association between two persons may be represented by a line linking two nodes. Several metrics can be derived from or used to quantify characteristics in a social network having multiple nodes and lines. For example, a "relation degree" can be a simple metric for characterizing how close two nodes are. Two nodes have a first-degree relation if there is a line directly linking the two nodes, which may reflect that the two nodes can contact with each other directly, such as by phones, e-mails, instant messages, peer-to-peer streaming, and etc. Two nodes have a second-degree relation if they have one node in between and are coupled through two lines. Two nodes having a relation degree order beyond the first degree relation may suggest that the two corresponding persons do not know each other, but do have a certain relationship, such as one common contact, between them.

Various social-network platforms may be set up to connect users and provide their associations. Those platforms may present themselves in the form of websites, through which associations between people can be made, contacts can be stored, and networks can be constructed. Privacy measures or rules may be applied, such as by basing on certain metric(s) (characteristics) to limit direct contacts between users who might not know each other. There may be tradeoffs between loose and strict rules. Loose rules may unnecessarily expose user privacy, while strict rules may limit the interactions among members of a social network. Some social network applications may also provide limited functions or capabilities, making the use of computers preferable or necessary, which may limit the growth of the social network.

Therefore, it may be desirable to provide methods, systems, or both for associating users with one or more characteristics, such as adequate privacy protection, convenience in access, compatibility with mobile or portable devices, etc.

SUMMARY

The disclosed embodiments provide a method for associating a first user using a first device and a second user using a second device. The method may include receiving an invitation request from the first user; verifying, by a verification server, the invitation request; sending an invitation to the second user after verifying the invitation request; and receiving an acknowledgement from the second user to acknowledge an association between the first user and the second user. The invitation request may be identified as directed to the second user and may include at least a device token associated with at least one of the first and second devices and an identification associated with at least one of the second device and the second user. Verifying the invitation request from the first user may include using at least one of a node identification associated with the first device, a society identification associated with the first user, and a network address associated with the first device. The invitation may include the device token and profile information associated with the first user The disclosed embodiments also provide a method for a first user using a first device to associate with a second user using a second device. The method may include: sending an invitation request from the first user, the invitation request being identified as directed to the second user. The invitation request may include at least a device token associated with at least one of the first and second devices and an identification associated with at least one of the second device and the second user. The device token was provided by one of the first and second devices during an initial contact. The method may also include: providing with the invitation request at least one of a node identification associated with the first device, a society identification associated with the first user, and a network address associated with the first device; and receiving a notification confirming an association between the first user and the second user.

The disclosed embodiments also provide a non-transitory, computer-readable storage medium including instructions stored thereon. The instructions, when executed by a processor, cause the processor to carry out a method for a first user using a first device to associate with a second user using a second device. The method may include: sending an invitation request from the first user, the invitation request being identified as directed to the second user, the invitation request comprising at least a device token associated with at least one of the first and second devices and an identification associated with at least one of the second device and the second user, wherein the device token was provided by one of the first and second devices during an initial contact; providing with the invitation request at least one of a node identification associated with the first device, a society identification associated with the first user, and a network address associated with the first device; and receiving a notification confirming an association between the first user and the second user.

It is to be understood that both the foregoing general description and the following detailed description are exemplary and explanatory and are not restrictive of the subject matter as claimed.

BRIEF DESCRIPTION OF THE DRAWINGS

The accompanying drawings, which are incorporated in and constitute a part of this specification, serve to explain the features, advantages, and principles of the disclosed embodiments.

In the drawings,

FIG. 8 is an exemplary acknowledgement lookup table consistent with the disclosed embodiments;

FIG. 13 illustrates an exemplary invitee table consistent with the disclosed embodiments;

DESCRIPTION OF THE EMBODIMENTS

Reference may now be made in detail to the present embodiments, examples of which are illustrated in the accompanying drawings. Wherever possible, the same reference numbers may be used throughout the drawings to refer to the same or like parts.

The disclosed embodiments provide systems, methods, or both, for associating two or multiple users. Additional security, privacy, or protection may be provided through a local or initial contact that allows two users or two devices to identify or communicate with each other, such as a mobile or a portable device making an initial contact or local contact with another one. An example includes the use of one or more device tokens that can be verified in a later process. Additionally, information transmitted, such as information in invitation requests, invitations, acknowledgements, etc., may be encrypted, such as by using a combination of keys, which may include a public key, a device-dependent key, or both, in one embodiment. The disclosed embodiments are operable through the use of mobile devices, such as various portable devices having communication functions.

In one embodiment, a mobile device may be assigned with a unique identification code as its node identification (NID) in the social network. As an inviter mobile device exchanges certain information, such as a token, with an invitee mobile device by using ad hoc technology, a society association process can be initiated by the inviter mobile device by noticing a server, such as a social network server ("SNS") with information including the token. SNS may generate another token or use the received one in a society association process. By using one or two tokens, authentications between the mobile devices and an SNS can be accomplished. Because the NID is confidential, the two mobile devices can avoid getting each other's NID (or providing its own NID) during the association process. For security consideration, some embodiments may apply a public key system (PKS) to establish secured communication channels. In one embodiment, only the communication channel between the mobile devices and the SNS may be secured by PKS, making the ad hoc connection, i.e. the communication channel between mobile devices, a simple one.

Figure 1:
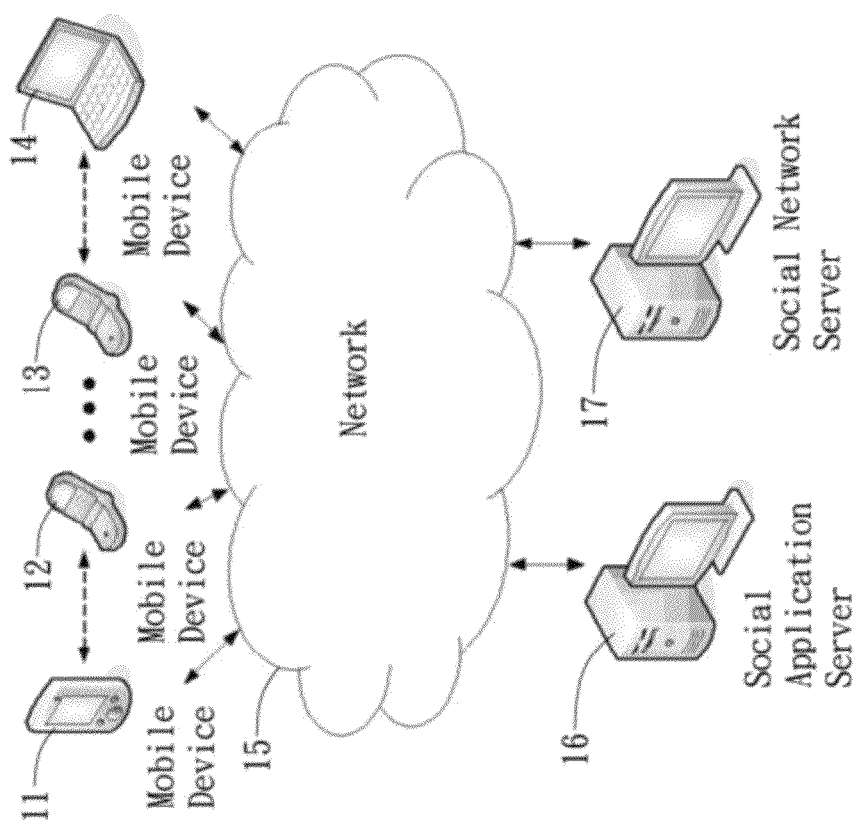
FIG. 1 is a schematic view of an exemplary network system consistent with the disclosed embodiments.

FIG. 1 is a schematic view of an exemplary network system consistent with the disclosed embodiments. As shown in FIG. 1, the network system may include mobile devices 11, 12, 13, and 14, a network 15, an optional social application server 16, and a social network server (SNS) 17. Mobile devices 11, 12, 13, and 14 may include any computing device capable of receiving/sending data, packets, or messages over the network from/to SNS 17 and capable of contacting each other via ad hoc connections. These mobile devices may include devices that typically connect using a wireless communications medium. An example of these mobile devices may include smart phones, cell phones, laptops, ultratops, personal computers, personal digital assistants (PDAs) having wireless communication functions, and walkie-talkie, etc. The optional social application server 16 may provide social application or part of such implementation based on the social network database managed by SNS 17.

As shown in FIG. 1, one computing device may be connected to or coupled with another via network 15, allowing the two computing devices to communicate with each other. Network 15 can be any medium for communicating information among electronic devices. For example, network 15 may include wireless and wired interfaces, including local area network (LAN) and wide area network (WAN), for communications among devices. In one embodiment, local area networks may be constructed by hubs and/or switches, and a router may be used to couple the LAN and the WAN, hence expanding communication ranges.

Figure 2:
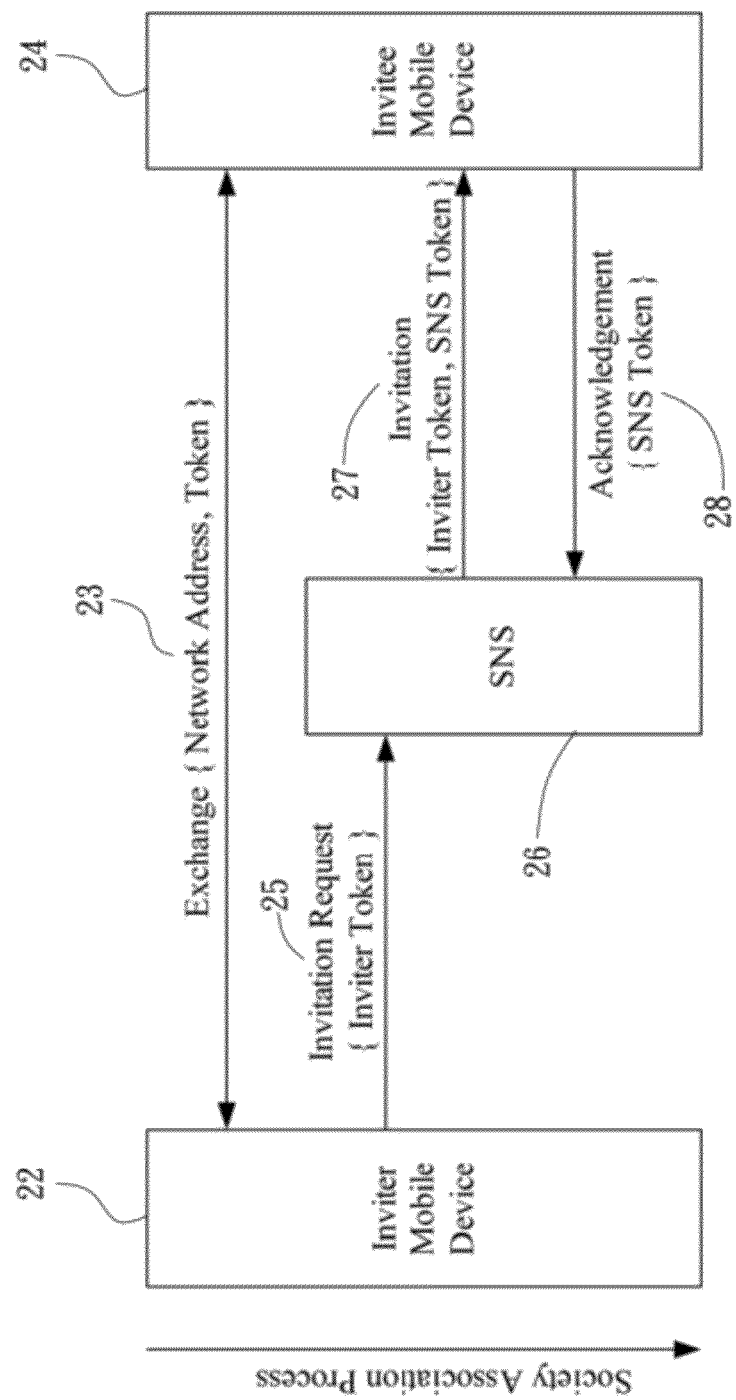
FIG. 2 is a schematic view of an exemplary process of associating two users, consistent with the disclosed embodiments.

FIG. 2 is a schematic view of an exemplary process of associating two users, consistent with the disclosed embodiments. As shown in FIG. 2, the process may include four exemplary steps, some or all of which may be employed to complete an association process between two mobile devices.

In step 23, two mobile devices 22 and 24 may exchange each other's network address and provide or receive a token via ad hoc connection; at step 25, one of the two mobile devices may act as an inviter mobile device 22 and may send a message, which may include an inviter token and an invitee identification, such as an invitee network address, to the SNS 26. The message may be an invitation request.

At step 27, the SNS 26 may send a message to the other mobile device, and the message may include the invitee network address of the invitee mobile device 24. The message may be called an invitation, which may also include the inviter token and an SNS-generated token. At step 28, the invitee mobile device 24 may receive the message from the SNS 26 and verify or validate the message by comparing the inviter token and the previously exchanged token that the invitee device received at step 23. If verified or validated, the invitee mobile device 24 may send a message, which may include the SNS-generated token to the server to accept the invitation, and the message may be called an acknowledgement.

At step 23, two mobile devices may exchange data based on ad hoc technology or contact. In one example, the exchanged data may include each other's network address and a token. The token may be a text-based token, such as currently user-named device identification. Text-based tokens can be used for users of mobile device to intuitively authenticate each other. The token can also be used to determine whether the society association is valid in step 28.

At step 25, one of the two mobile devices may act as an inviter and send a message called invitation request to inform the SNS that the inviter wants to invite a mobile device or a user at a specified network address to join a specified society. In this step, the invitee mobile device's current network address and the inviter mobile device's token may be provided by the inviter. The invitee network address identifies to the SNS where the invitee mobile device is.

At step 27, the server may send an invitation to the invitee mobile device 24 (identified by, such as, the provided network address) to notify the invitee that the society wants to invite the invitee mobile device 24 to join. In this step, two tokens may be sent to the invitee mobile device 24, wherein one of the tokens may be provided by the inviter mobile device 22 and the other may be generated by the SNS 26.

At step 28, the invitee mobile device 24 may compare the inviter token in the invitation with the previously-exchanged token to determine whether the invitation from SNS 26 is consistent with the currently ad hoc connected nearby mobile device. If the tokens are consistent and the user of the invitee mobile device wants to accept the invitation, the invitee mobile device may send a message, such as an acknowledgement, which may include the SNS-generated token to the SNS, to accept the invitation. After receiving the acknowledgement, the SNS may check whether the SNS-generated token is valid to authenticate the acknowledgement. If the received token is valid, the SNS associates the invitee's node with the inviter's society in the social network database to finish the society association process.

In some embodiments, each mobile device may be assigned a unique identification code associated with a node in the social network database. The identification code may be named as a node identification (NID). The NID can be any identification associated with and uniquely identify a device or a user. For example, a WLAN MAC address is unique in a wireless local area network; the coding inside the subscribe Identification module (SIM) is also unique in a cell phone system. Combining existing coding forms with certain extension code can assure uniqueness in an expanded network.

Figure 3:
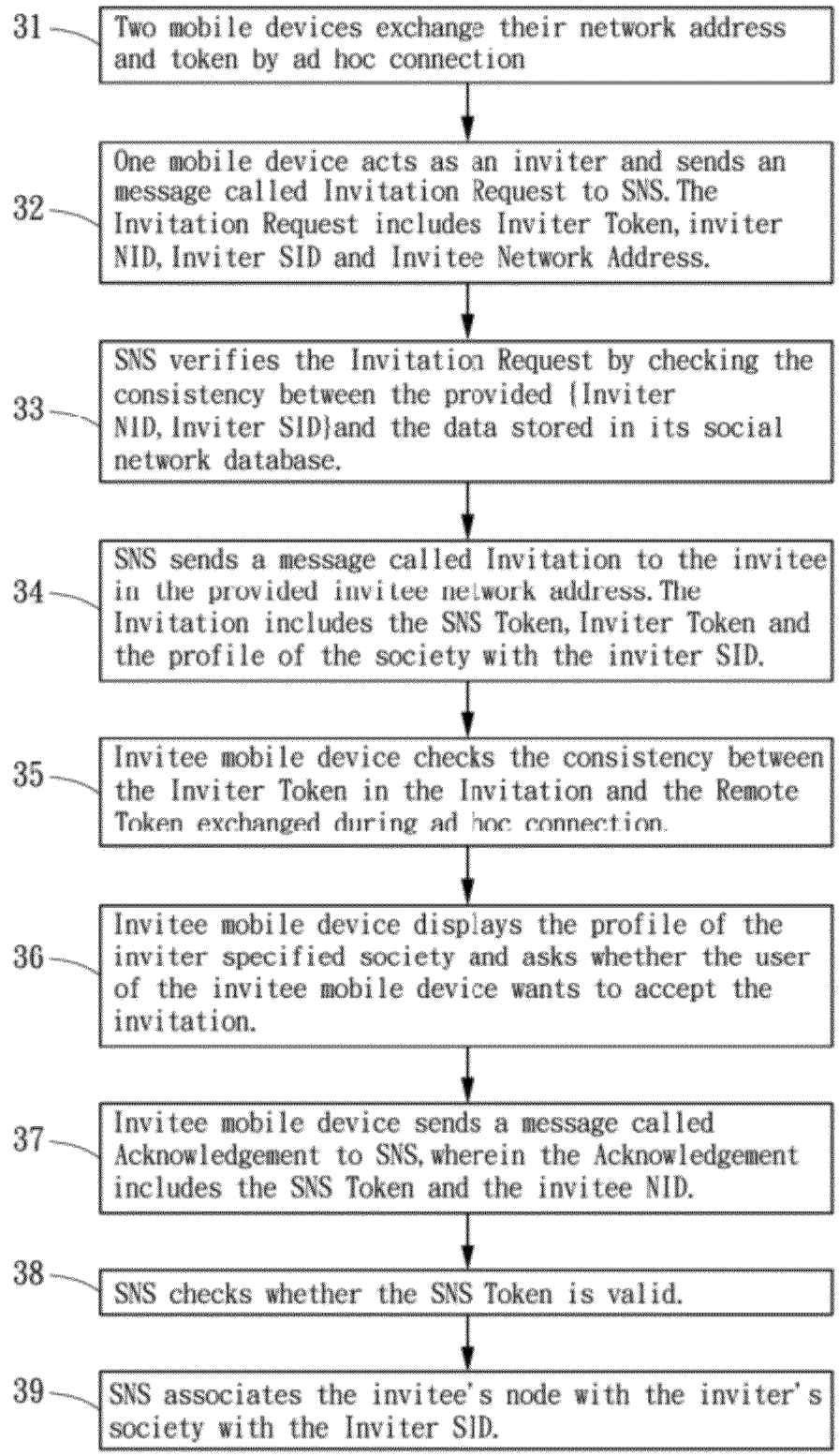
FIG. 3 is an exemplary flow chart illustrating a method of associating two users, consistent with the disclosed embodiments.

FIG. 3 is an exemplary flow chart illustrating a method of associating two users, consistent with the disclosed embodiments. An exemplary process of actions by an inviter mobile device, an invitee mobile device, and an SNS that associates nodes in a social network is illustrated.

As shown in FIG. 2 and FIG. 3, methods consistent with the disclosed embodiments may include two mobile devices conducting an association process to associate their corresponding nodes in a social network managed by an SNS. During the association process, the mobile device initiating the process can be named as the inviter mobile device, and the other may be named as the invitee mobile device. In step 31, the two mobile devices may have an initial or local contact, such as by an ad hoc connection, and may exchange certain data or certain of their identifications, such as their assigned network addresses (by, for example, a DHCP server) and exchange one or both of their tokens. Each mobile device may have a local token, and the exchanged token may be a remote token. Each token can be a text-based token, such as a currently user-named device identification. The text-based token could be a user-named device identification appended with a timestamp, which may provide improved confidentiality or security. It is common that a user may name his or her mobile device or cell phone. For example, a cell phone having Bluetooth function may allow a user to name the cell phone in text so that another Bluetooth user may discover the cell phone with the name. With the text-based tokens exchanged and shown on the display of mobile devices, the users of mobile devices can intuitively authenticate each other. While a text-based token is sufficient to authenticate each other in many applications, other authentication or identification methods can be used.

Although the exchanged of data occurs during an association, the embodiments of exchanging identifications that might not be confidential or highly confidential to the user of each mobile device may reduce security concern. For example, exposing the token and/or the currently assigned network address is less likely to pose security risks when compared with exposing other types of information associated with a user or the corresponding mobile device.

After exchanging each other's network address and token, at step 32, a mobile device may act as an inviter and construct or send a message, such as an invitation request, based on the exchanged data and some information managed by the inviter mobile device. In one example, an invitation request may include one or more of a inviter token, an inviter NID, an ID of the specified society (inviter society ID or inviter SID), and the invitee network address. After the constructing, the constructed invitation request is sent to the SNS.

In response to the invitation request, in steps 33 and 34, the SNS may validate or verify the message by comparing the pair of inviter NID and inviter SID with the data stored in its social network database. A non-match means that the inviter has no authority to initiate an invitation and the invitation is not processed. Otherwise, a token called SNS token is generated by the SNS for the invitation and a message called invitation is sent to the invitee mobile device identified by an invitee network address. The invitation includes at least the generated SNS token, inviter token and the profile of the society with the inviter SID. The SNS token is associated with a table entry for storing the content of the invitation request, wherein the associated table is called an acknowledgement lookup table. With this association, the content can be quickly referred by the SNS token.

In steps 35, 36 and 37, after receiving the invitation, the invitee checks whether the inviter token in the invitation is consistent with the remote token exchanged during the ad hoc connection. If not consistent, the invitation is not valid and the invitation is failed. If consistent, the invitee mobile device displays the profile of the society provided in the invitation and asks whether the user of the invitee mobile device accept the invitation. If the user of the invitee mobile device rejects the invitation, the invitation is failed. If the user accepts the invitation, the invitee mobile device constructs and sends a message called acknowledgement to the SNS, wherein the acknowledgement at least includes the provided SNS token and invitee NID.

In steps 38 and 39, after receiving the acknowledgement, the SNS checks the validity of the acknowledgement by checking the validity of the received SNS token. Since each SNS token is associated with an entry of the acknowledgement lookup table which stores the content of invitation request, if the received SNS token is valid, the SNS associates the invitee's node with the society identified by the inviter SID and the society association process is accomplished.

Figure 4:
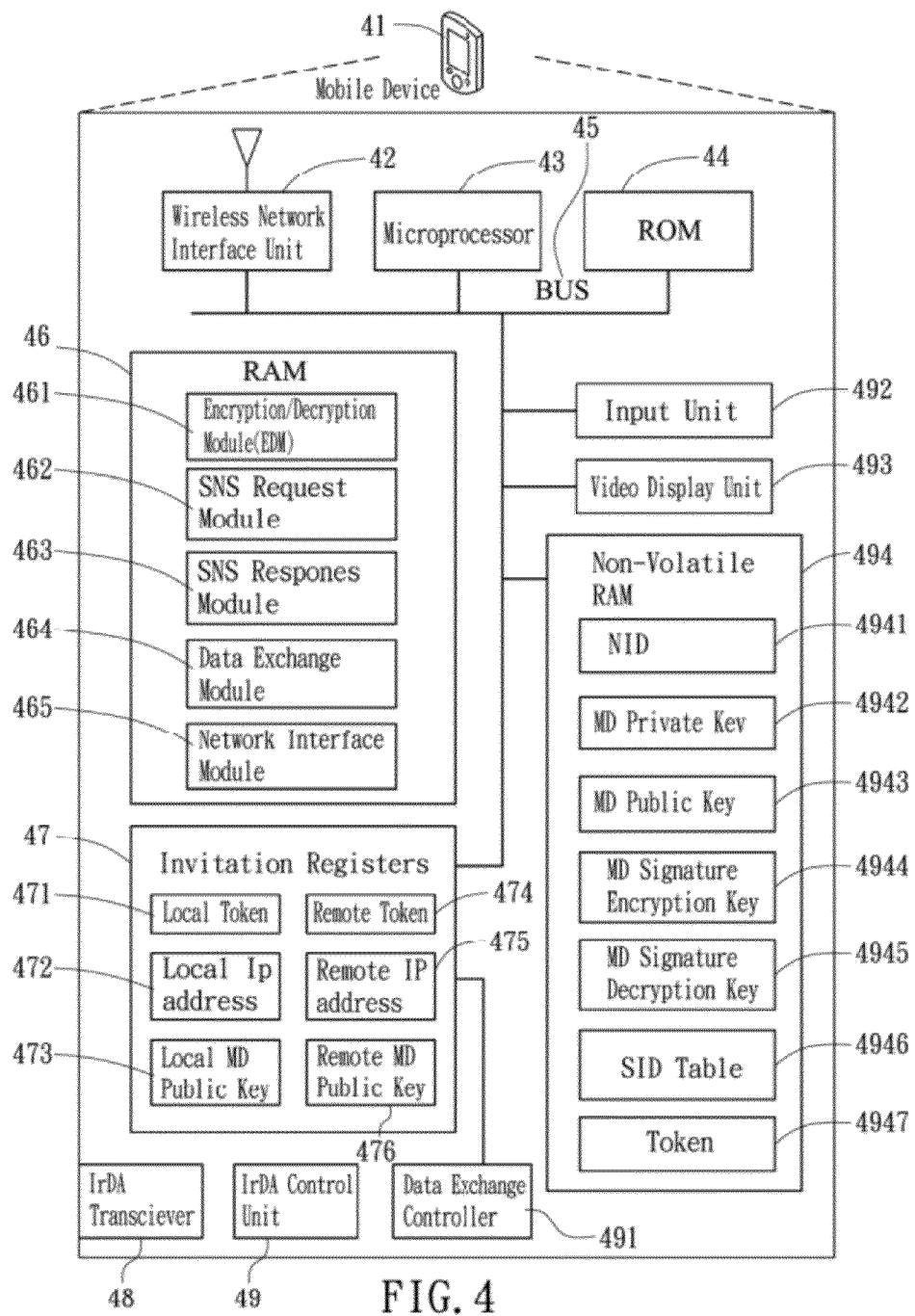
FIG. 4 is a schematic view showing the structure of a mobile device consistent with the disclosed embodiments.

FIG. 4 is a schematic view showing the structure of mobile device 41 consistent with the disclosed embodiments. As shown in FIG. 4, mobile device 41 may include fewer or more components than those shown. The components shown, however, are sufficient to disclose an illustrative embodiment for practicing the disclosure.

Mobile device (MD) 41 shown in FIG. 4 includes a microprocessor 43, a video display unit 493, an input unit 492, a ROM 44, a RAM 46 and a Non-Volatile RAM (NVRAM) 494, all in communication with each other via a bus 45. NVRAM 494 contains an NID 4941 which identifies the mobile device 41 as a unique node in the social network database managed by the SNS. The NVRAM 494 further includes two key pairs consistent with the public key system (PKS). The first key pair contains an MD private key 4942 and an MD Public key 4943, and the other contains an MD signature encryption key 4944 and an MD signature decryption key 4945. The NVRAM 494 further includes a society ID table 4946 recording the SID of each society which the mobile device currently joined.

The MD public key is made available to all computing components which communicate with the mobile device. Computing components which want to send confidential messages to the said mobile device should first encrypt the messages by the mobile device's MD public key 4943 and then send the encrypted message to the mobile device. An encryption/decryption module (EDM) 461 of the mobile device uses its MD private key 4942 to perform decryption and then read the content of the messages. Consistent with the PKS, since the message encrypted by an encryption key of the key pair can be only decrypted by the decrypted key of the key pair, the computing components sending the confidential message can assure that the content of the message can only be read by mobile device 41. Hence the key pair of MD public key 4943 and MD private key 4942 is utilized by the embodiment for confidentiality.

MD signature decryption key 4944 is communicated to the SNS before the society associating procedure. Then an EDM 461 of the mobile device uses MD signature encryption Key 4944 to encrypt the mobile device's signature. In the embodiment, the mobile device uses its token 4947, e.g. a text-based token, as its signature. The said token is encrypted by EDM 461 based on MD signature encryption key 4944 and the encrypted token will be sent to the SNS while the mobile device is sending an invitation. In the invented society association process, the inviter mobile device puts the encrypted token into the invitation request and sends it to the SNS. Consistent with the PKS, since data encrypted only by the MD signature encryption key can be correctly decrypted by the previously sent MD signature decryption key 4945, the SNS is convinced that the packet with encrypted token is from the inviter mobile device as long as the encrypted token can be correctly decrypted. Note that, since the token is generated by the mobile device and the SNS has not recognized it, the definition of "correctly decrypted" is that a text-based result is received after decrypting the encrypted token. A text-based result can identified easily in a computer system by checking whether the range of ASCII code of each decrypted character of the encrypted token is within the range of ASCII code of text characters.

The mobile device further includes a data exchange controller 491 which controls an IrDA control unit 49 to make ad hoc connection with a remote mobile device. An IrDA transceiver 48 converts Infrared radiation signals to electrical signals and converts electrical signals from IrDA Controller Unit 49 to infrared radiation signals, so that IrDA control unit 49 and IrDA transceiver 48, data exchange controller 491 exchanges data with a remote mobile device. The exchanged data includes both the mobile device's token, network address (IP Address assigned by DHCP server in this embodiment) and MD public key. The exchanged data is stored in invitation registers 47 as shown in FIG. 4.

Data exchange module 464 in RAM 46 is executed by microprocessor 43 to initialize invitation registers 47 and enable data exchange controller 491 to start exchanging data with a remote mobile device. To initialize invitation registers 47, data exchange module 464 copies token 4947 in NVRAM 494, the assigned IP address given by network interface module 465 and MD public key 4943 in NVRAM 494 to local token 471, local IP address 472, and local MD public key 473 in invitation registers 47 respectively. After initialization, data exchange module 464 enables data exchange controller 491 to start exchanging data with the remote mobile device.

The mobile device further includes SNS request module 462 which may generate the embodiment of the message invitation request, i.e. the invitation request packet, based on the data in invitation registers 47 and data in NVRAM 494. As shown in FIG. 8, the invitation request packet contains an inviter token, inviter NID, inviter SID, invitee IP address and invitee public key. The inviter token and the invitee IP address are copied from local token 471 and remote IP address 475 in invitation registers 47 while the inviter NID and inviter SID are copied from NID 4941 and SID 4946 in NVRAM 494. The inviter SID is selected from society ID table 4946 in NVRAM 494 by the user. Since the SNS owns a copy of SID table 4946 for each mobile device (or called node,) the mobile device can only pick one SID from its society ID table 4946 as a valid inviter SID. An invitation request packet containing an incorrect inviter SID will be dropped by the SNS. Several security mechanisms can be conducted by the SNS to manage this, such as recording the event and/or sending warnings to the mobile device with the NID. After the invitation request packet is constructed, the SNS request module 462 sends it to the SNS via the network interface module.

For security considerations, SNS request module 462 may enable EDM 461 to encrypt the payload of the invitation request packet consistent with the SNS public key. Before the encryption, the inviter token in the payload is replaced by an encrypted one as mentioned (by the MD signature encryption key.)

The mobile device further includes SNS response module 463 to interact with the messages from SNS. The SNS receives an invitation request packet which records the invitee network address. The SNS may send, if the invitation request packet is valid, an embodiment of the invitation called invitation packet to the mobile device in the invitee network address. The invitation packet may comprise an SNS token, the inviter token, and the profile of the inviter specified society. After the mobile device receives the invitation packet from the SNS, SNS response module 463 compares the inviter token with the previously exchanged remote token in invitation registers 47 to authenticate the received invitation packet. If the inviter token matches remote token 474, the received invitation packet is valid and the profile of the inviter specified society is displayed in video display unit 493 for the user's reference. SNS response module 463 also asks the user of the mobile device to accept the invitation. If the user accepts the invitation, an embodiment of the acknowledgement packet is constructed by SNS response module 463 and sent to the SNS via the network interface module. The acknowledgement packet comprises the SNS token, the invitee NID and the invitee token.

For security considerations, SNS response module 463 may ask EDM 461 to encrypt the payload of the acknowledgement packet consistent with the SNS public key, and before the encryption, the invitee Token in the payload is replaced by the encrypted one (by the MD signature encryption key.)

Figure 5:
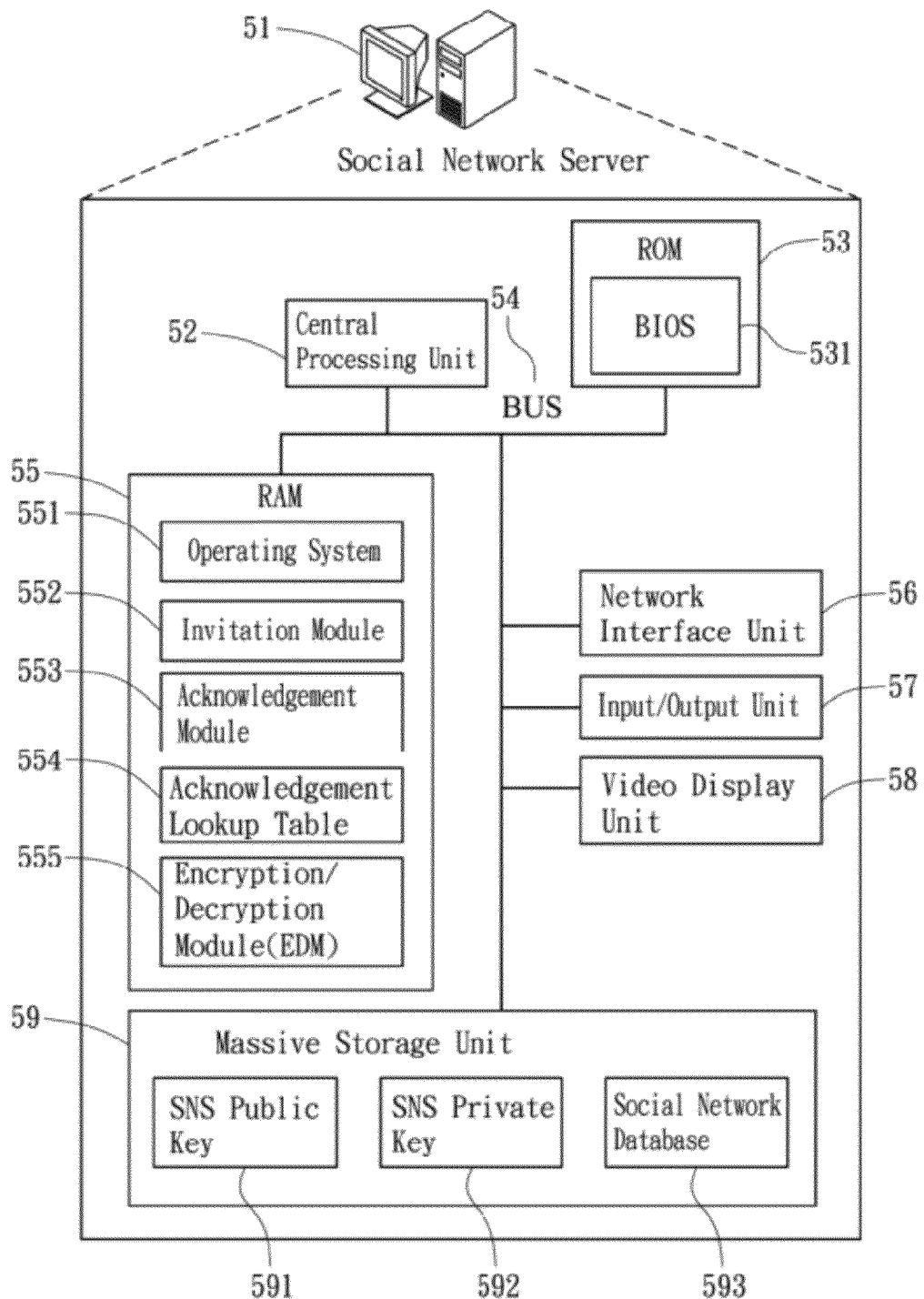
FIG. 5 is the schematic view of an exemplary network server, consistent with the disclosed embodiments.

FIG. 5 is the schematic view of an exemplary social network server 51, consistent with the disclosed embodiments. SNS 51 may include fewer or additional components than those shown. The components shown, however, are sufficient to disclose an illustrative embodiment for practicing the disclosure.

As shown in FIG. 5, SNS 51 includes a central processing unit 52, a video display unit 58, a massive storage unit 59, all communicating via a bus 54. Massive storage unit 59 may be a combination of non-volatile memory, hard disk, CD-ROM, DVD-ROM or any media which can permanently store data. SNS 51 also includes a network interface unit 56 constructed for use with various communication protocols including but not limited to TCP, UDP and IP protocols to communicate with other computing devices. Basic input/output system (BIOS) 531 is provided for controlling the low-level operation of SNS 51. An operating system 551 may be employed to run modules stored a RAM 55 and to provide needed communication protocols as mentioned.

Other than operating system 551, RAM 55 may further include modules for conducting society association processes, such as an invitation module 552 and an acknowledgement module 553 shown in FIG. 5. Invitation module 552 is responsible for authenticating a received invitation request packet, constructing invitation packet, sending a constructed invitation packet to an invitee mobile device in specified IP address and associating the invitee mobile device with the inviter specified society. Acknowledgement module 553 is responsible for generating the SNS token, managing an acknowledgement lookup table 554 and authenticating incoming acknowledgement packet. RAM 55 may further include an encryption/decryption module (EDM) 555 to do encryption/decryption on the necessary outgoing/incoming packet respectively. The interaction relationship is shown in FIG. 6.

Figure 6:
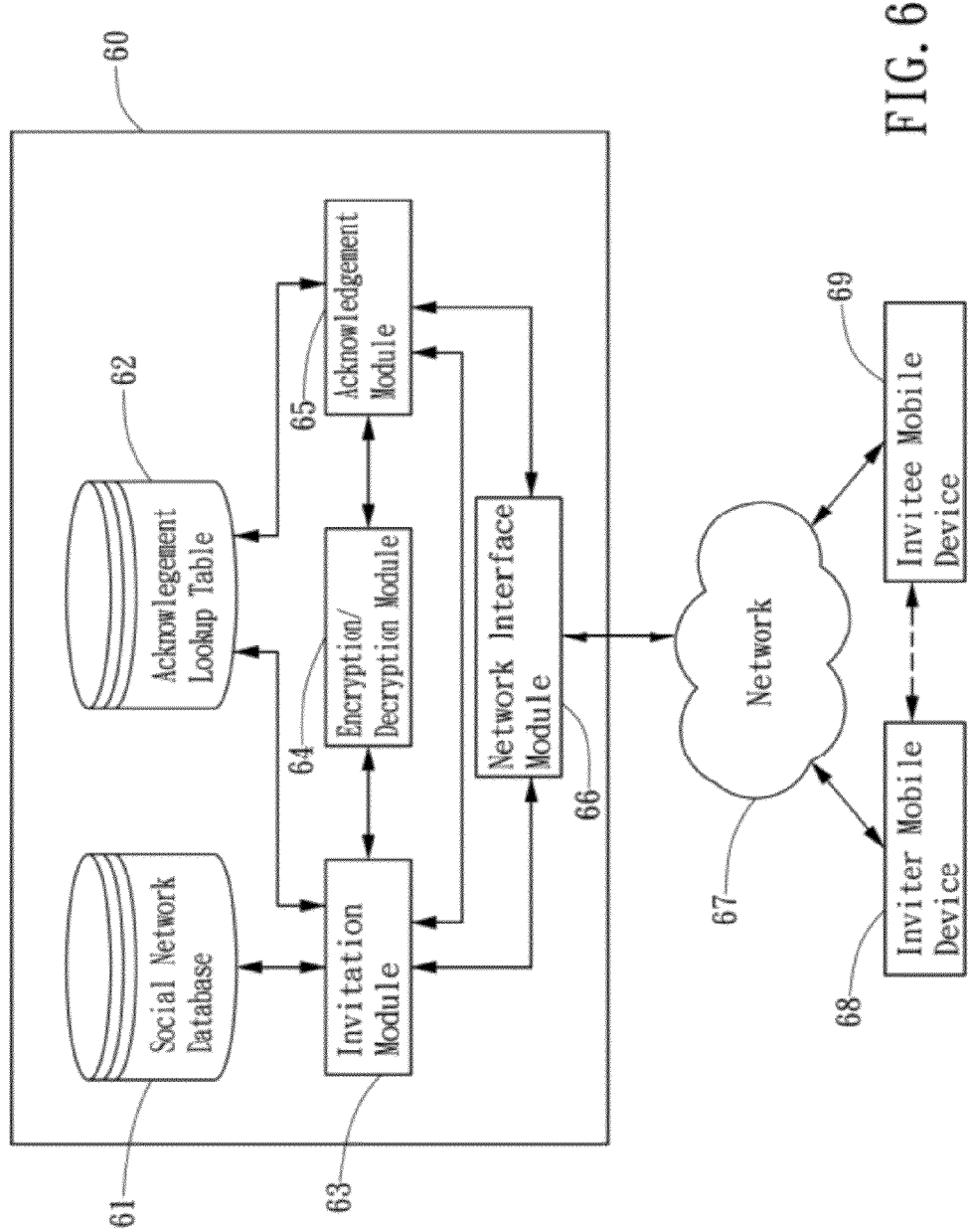
FIG. 6 is a schematic view illustrating exemplary couplings between an exemplary network server and mobile devices via a network, consistent with the disclose embodiments.

FIG. 6 is a schematic view illustrating exemplary couplings between an exemplary network server and mobile devices via a network, consistent with the disclose embodiments. FIG. 6 illustrates an exemplary architecture that may be used to send an invitation to an invitee mobile device consistent with an inviter mobile device's request and to have society association consistent with the acknowledgement from the invitee mobile device.

As shown in FIG. 6, mobile devices 68 and 69 exchange each other's IP address, token and MD public key prior to initiating a society association process with an SNS 60 containing an invitation module 63, an acknowledgement module 65, and an EDM 64. Invitation module 63 interfaces with a social network database 61 for conducting society association while storing temporary invitation information in an acknowledgement lookup table 62. Acknowledgement module 65 manages the space of Acknowledgement lookup table 62 and generates an SNS token for each invitation. Both invitation module 63 and acknowledgement module 65 interface with a network interface module 66 for communicating with mobile devices 68 and 69. Network interface module 66 to which invitation module 63 and acknowledgement module 65 are interfacing is provided by any general-purpose operating system.

Figure 7:
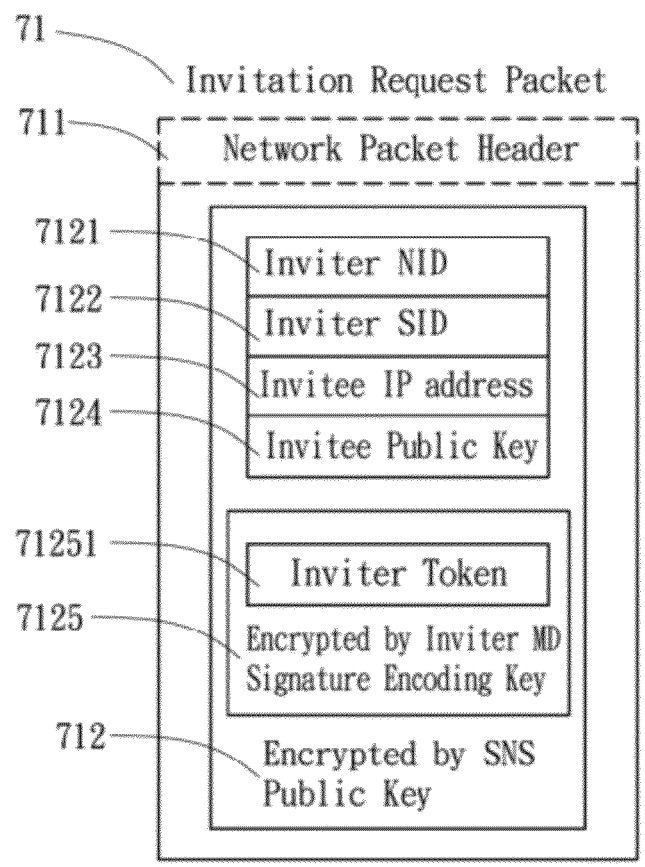
FIG. 7 illustrates an exemplary invitation request packet consistent with the disclosed embodiments.

FIG. 7 illustrates an exemplary invitation request packet 71 consistent with the disclosed embodiments. Referring to FIG. 6 and FIG. 7, invitation module 63 receives invitation request packet 71 from network interface module 66. To authenticate received invitation request packet 71, invitation module 63 requests EDM 64 to decrypt the payload of received invitation request packet 71 by the SNS private key; uses an inviter NID 7121 to retrieve the inviter's MD signature decryption key 1112 in social network database 61; requests EDM 64 to decrypt an encrypted inviter token 71251 by a retrieved MD signature decryption key 7125; and checks whether the decryption result, i.e. the inviter token, is text-based. If the decryption result is text-based, uses inviter NID 7121 to retrieve each SID of the society which the mobile device currently joined and compare retrieved SID with an inviter SID 7122 in invitation request packet 71. If inviter token 71251 is text-based after decrypting and there is a retrieved SID consistent with inviter SID 7122, the invitation request packet passes the authentication.

Invitation module 63 associates an SNS token to each valid invitation request packet. In this embodiment, invitation module 63 requests the acknowledgement module to give an available entry of the acknowledgement lookup table, as shown in FIG. 8, to store the contents of the invitation request packet. The index to the given entry is directly regarded as the SNS token in this embodiment.

FIG. 8 is an exemplary acknowledgement lookup table consistent with the disclosed embodiments. An acknowledgement index 81 is directly regarded as the SNS token and the contents of the invitation request packet are stored in the table entry indexed by a given acknowledgement index. In order to generate a valid SNS token, i.e. an index to an available entry in the embodiment, and manage the acknowledgement lookup table, acknowledgement module 6 may use a ring-like buffer management method including certain flags as an "In Use" flag 82 shown in FIG. 8. In this embodiment, since the SNS token and the Acknowledgment lookup table are directly associated, the authentication to the received acknowledgement can be conducted by comparing the society ID in the entry indexed by the SNS token with the received inviter SID in the acknowledgement packet.

Figures 9, 10:
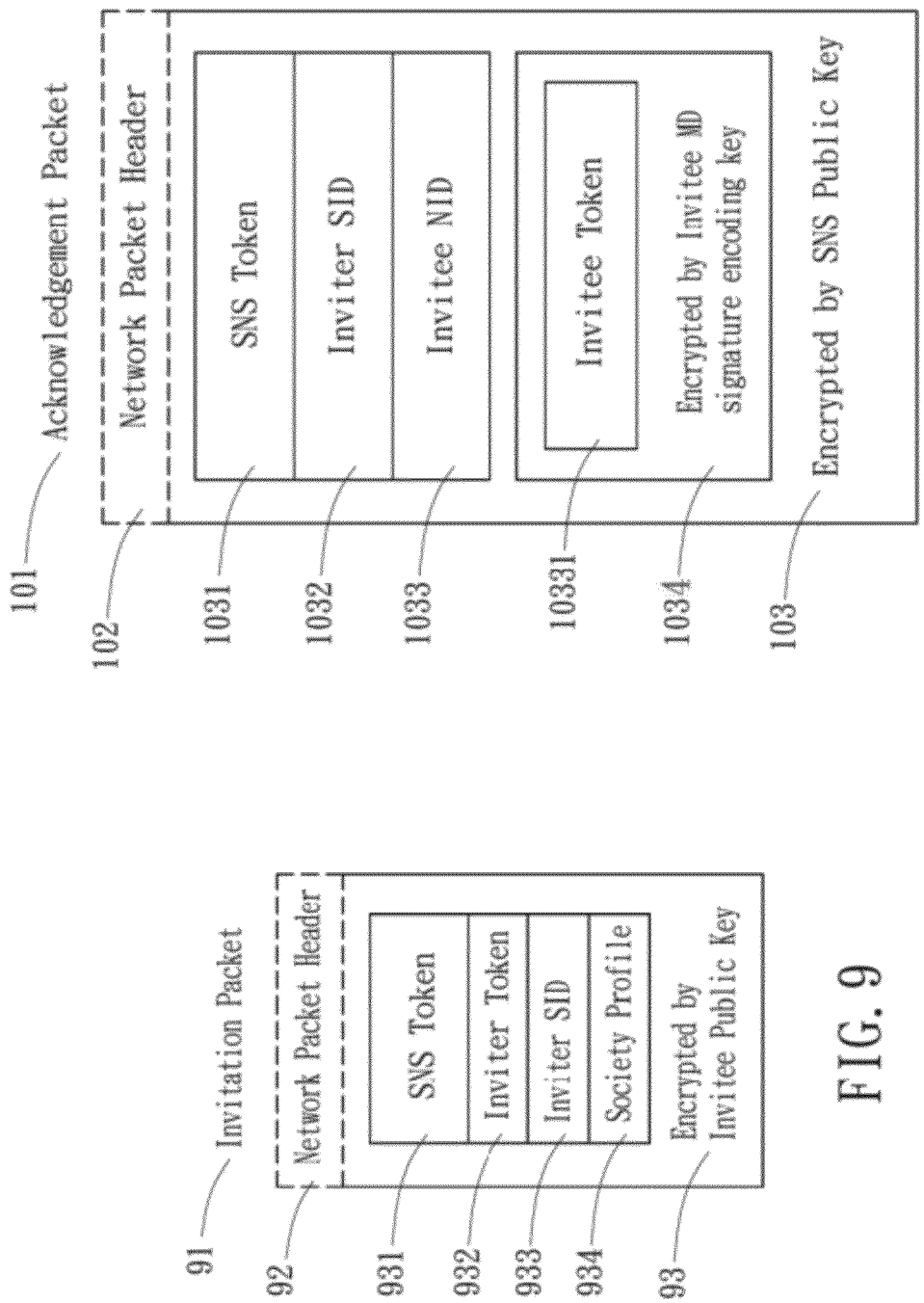
FIG. 9 illustrates an exemplary invitation packet consistent with the disclosed embodiments.
FIG. 10 illustrates an exemplary acknowledgement packet consistent with the disclosed embodiments.

FIG. 9 illustrates an exemplary invitation packet 91 consistent with the disclosed embodiments. Invitation module 63 may generate invitation packet 91 by including fields of an SNS token 931, an inviter token 932, an inviter SID 933 and a profile of society 934 with inviter SID 933 as shown in FIG. 9. Invitation module 63 requests EDM 64 to encrypt the payload of invitation packet prior to send it to the mobile device in the provided invitee IP Address.

As mentioned, acknowledgement module 65 manages the space of the acknowledgement lookup table. As the invitation module 63 requests sending a new invitation packet, the acknowledgement module 65 finds an available entry in the acknowledgement lookup table 62 and assigns the corresponding entry index to the invitation module 63 as the SNS token.

FIG. 10 illustrates an exemplary acknowledgement packet 101 consistent with the disclosed embodiments. When the invitee mobile device returns acknowledgement packet 101, as shown in FIG. 10, the acknowledgement module 65 first requests EDM 64 to decrypt the payload of acknowledgement packet 101 by SNS public key 103 and then uses invitee NID 1033 to retrieve invitee mobile device's MD signature decryption key 1112. Acknowledgement module 65 authenticates acknowledgement packet 101 by requesting EDM 64 to decrypt an encrypted invitee token 10331 based on an MD signature decryption key 1034. If the text-based result is received after the decryption, acknowledgement packet 101 is sent from the invitee mobile device and the validation of received SNS token is further checked. The SNS token checking may be generated by first retrieving the entry of acknowledgement lookup table 62 indexed by the SNS token and then comparing the received inviter SID with society ID 87 in the retrieved entry. If consistent, acknowledgement packet 101 is valid and acknowledgement module 65 informs invitation module 63 to associate an invitee node identified by invitee NID 1032 with corresponding inviter node identified by the inviter NID in a specified society identified by the inviter SID.

Figure 11:
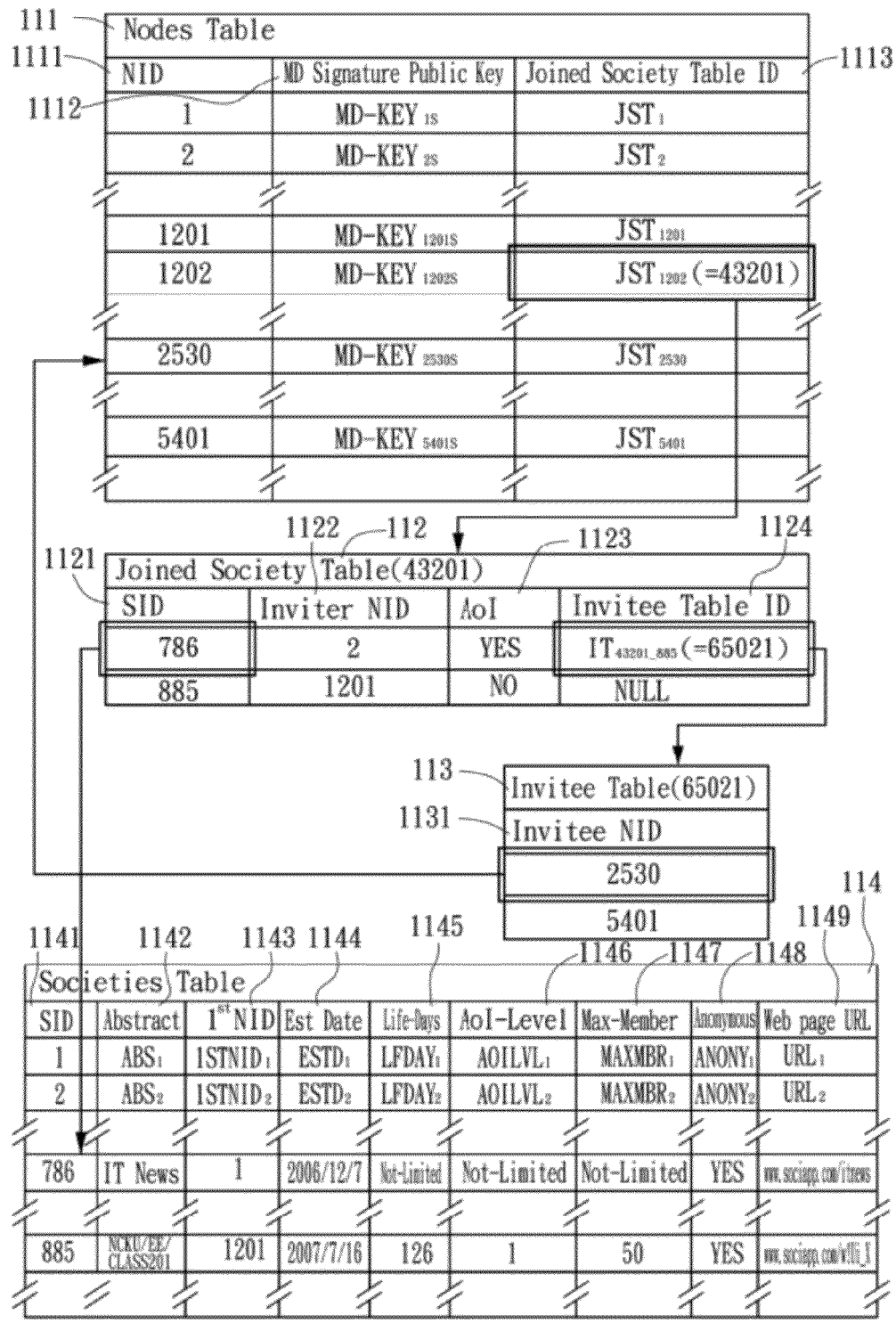
FIG. 11 illustrates an exemplary society network database consistent with the disclosed embodiments.

FIG. 11 illustrates an exemplary social network database consistent with the disclosed embodiments. A social network database may be managed by four types of tables as illustrated in FIG. 11. The four types of tables are associated with each other for recording the managed social network database. As shown in FIG. 11, a nodes table 111 contains fields including NID 1111, MD signature public key 1112 and joined society table ID (JST ID) 113. As a mobile device communicates its MD signature public key to the SNS before initiating a society association process, the SNS stores the key into node table 111 consistent with the mobile device's NID. For each NID, there is a unique joined society table 112 recording the societies which a corresponding mobile device currently joined. Each joined society table 112 is pointed by a field joined society table ID 1113 in nodes table 111. Joint society table 112 contains fields of SID 1121, inviter NID 1122, authority of invention (AoI) 1123, and invitee table ID 1124. For each joined society table 112, there is a unique invitee table 113 recording the invitee(s) which a corresponding mobile device currently and successfully invited. Each invitee table 113 is pointed by field invitee table ID 1124 in joined society table 112. Invitee table 113 contains fields of invitee NID 1131. society table 114 contains fields of SID 1141, abstract 1142, first NID 1143, established date (Est. Date 1144), life-days 1145, AoI level 1146, maximum number of members (Max. Members 1147), anonymous 1148, and web page URL 1149.

Figure 12:
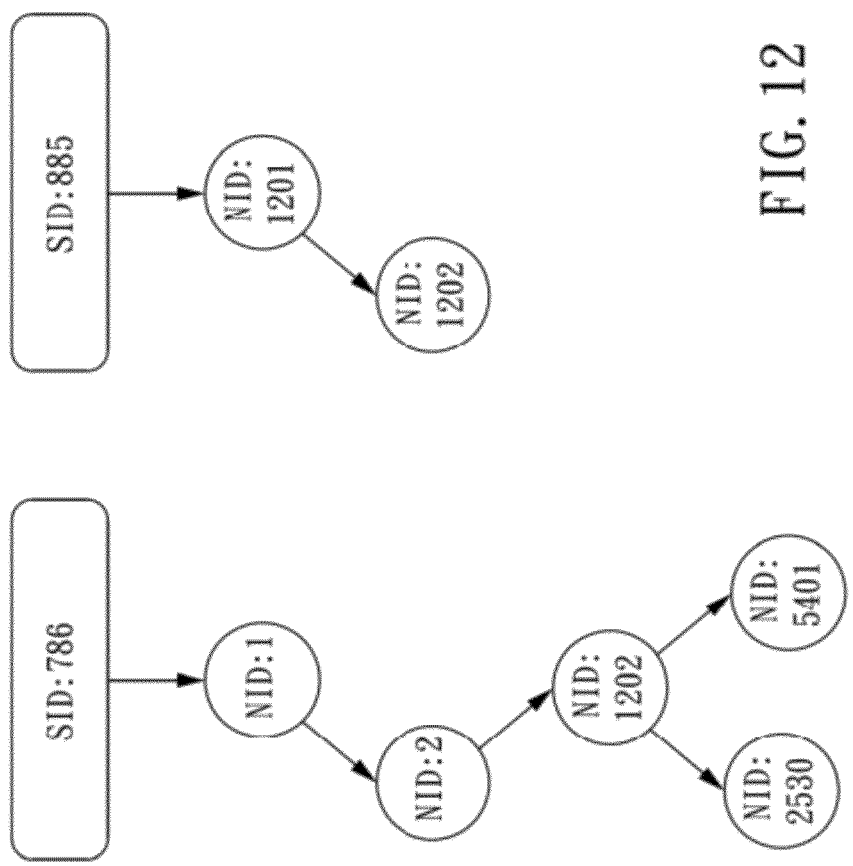
FIG. 12 illustrates an example with two societies managed within a social network database, consistent with the disclosed embodiments.

FIG. 12 illustrates an example with two societies managed within a social network database, consistent with the disclosed embodiments. Joined society table 112 in FIG. 11 contains a field of inviter NID 1122 and a field pointing to invitee table 113, recording the invitees who have been invited by the mobile device. Accordingly, a social network represented by a tree diagram can be derived. For example, the exemplary societies recorded in the social network database in FIG. 11 can be represented by the tree diagrams as shown in FIG. 12. The society with SID 786 and society with SID 885 are represented in tree diagrams for determining the relationship between their members (nodes). As shown in FIG. 12, the society with SID 786 has a mobile device with NID 1 as its root node and the root node has invited a node with NID 2 into the society with SID 786. The node with NID 1202 has been invited by the node with NID 2 and has invited node with NID 2530 and node with NID 5401 into the society with SID 786. The society with SID 885 has a mobile device with NID 1201 as its root node and the root node has invited a node with NID 1202 into the society with SID 885.

When receiving an invitation request packet, invitation module 63 requests EDM 64 to decrypt the payload of the packet by the SNS private key. In order to decrypt the encrypted inviter token, invitation module 63 retrieves the inviter's MD signature public key from the nodes table consistent with the inviter NID provided in the invitation request packet and request EDM 64 to decrypt the encrypted inviter token. If the decrypted inviter token is valid, i.e. text-based token in the embodiment, then invitation module 63 retrieves each SID of the society which the mobile device joined by first retrieving the JST ID in the entry indexed by the inviter NID and using the retrieved JST ID to retrieve a joined society table. Invitation module 63 compares inviter SID with the SIDs recorded in the retrieved joined society table. If there is a SID in the joined society table consistent with the inviter SID, the inviter mobile device is assured of having joined the society with the inviter SID.

Referring again to FIG. 8, an inviter mobile device having 1202 as its NID and "Ken" as its inviter token sends an invitation request packet to the SNS to invite an invitee mobile device in IP address 140.93.35.73 to join the society with SID 885. Invitation module 63 then checks whether the inviter mobile device is of the society with SID 885. This may be generated by finding the entry with NID 1202 in the nodes table shown in FIG. 11 and then retrieving the JST ID in that entry. As shown in FIG. 11, the inviter mobile device has JST ID as 43201 and by using the JST ID, a joined society table with JST ID 43201 can be retrieved. As recorded in joined society table with JST ID 43201, the inviter mobile device has joined the society with SID 786 and the society with SID 885. Since the inviter SID is consistent with an SID, i.e. 885, in the joined society table, the inviter mobile device is assured of having joined the society with the inviter SID.

As shown in FIG. 11, the joined society table 112 further comprises a flag called authority of invitation (AoI) 1123. The flag is derived from the field AoI-level in societies table 114, wherein AoI-level 1146 specifies from the root node, and notes the number of levels that have authority to generate an invitation for that society. AoI flag 1123 is cached in joined society table 112 for quickly determining whether the node has authority to invite other mobile devices.

Turning to the example of the mobile device with NID 1202, since AoI flag 1123 in the mobile device's joined society table 112 records the symbol "YES", the mobile device has authority to invite new member for the society with SID 786. After receiving the invitation request packet from the mobile device, invitation module 63 requests acknowledgement module 65 for a valid SNS token. As shown in FIG. 8, acknowledgement module 65 gives an acknowledgement index of 53026 as a valid SNS token and invitation module 63 stores the contents of the invitation request packet into the entry indexed by SNS token 53026 in the acknowledgement lookup table 62. An invitation packet including the SNS token 53026, the inviter token "Ken", the inviter SID 786 and the profile of the society with SID 786 is then sent to the invitee mobile device in IP address 140.93.35.73, wherein the profile of the society with SID 786 contains abstract "IT news", life-days "unlimited", AoI "yes", max-members "unlimited", anonymous "yes" and the website URL www.sociapp.com/itnews.

If the invitee mobile device in IP address 140.93.35.73 accepts the invitation, an acknowledgement packet containing SNS token 53026, inviter SID 786 and invitee NID, i.e. 1201 in this example, is sent from the invitee mobile device to the SNS. After decrypting the payload of the acknowledgement packet, The acknowledgement module retrieves the entry of acknowledgement lookup table 62 by the SNS token 53026 and compares the received inviter SID 786 with the society ID in the retrieved entry. Since the received inviter SID is consistent with the society ID in the retrieved entry as SID 786, the acknowledgement packet is valid and the invitee's node with NID 1201 is associated with the inviter's society with SID 786 by linking the inviter node with NID 1202 with the invitee node with NID 1201.

FIG. 13 illustrates an exemplary invitee table 131 consistent with the disclosed embodiments. Invitation module 63 adds NID 1201 into the invitee table 65021 (131 in FIG. 13) which is associated with inviter's joined society table with JST ID 43201. Invitee table 131 of inviter node with NID 1201 after adding NID 1201 is shown in FIG. 13, which is a schematic view showing invitee table 65201 consistent with the disclosed embodiments.

Figure 14:
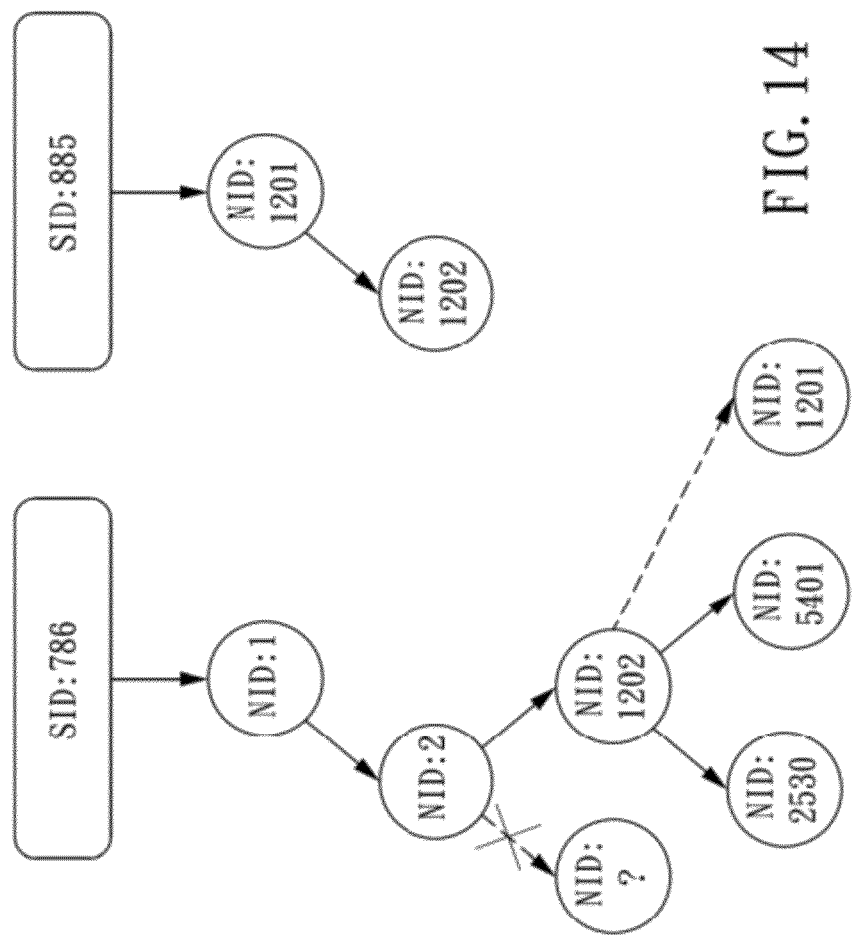
FIG. 14 illustrates tree representations of the results of two exemplary invitations, consistent with the disclosed embodiments.

Since the invitation initiated by the node with NID 1202 is successful and NID 1201 is added into the invitee table 65021, the tree diagram of the exemplary society can be updated as shown in FIG. 14. As another example in FIG. 8 and FIG. 14, the node with NID 2 initiated an invitation to invite a mobile device in IP address 140.96.194.35 and was rejected by the invitee. Since the invitee declined to join the society with SID 786, the invitee did not return its NID, hence even the SNS cannot know the NID of the invitee. Such a result further assures the user privacy of the system consistent with the disclosure.

FIG. 14 illustrates tree representations of the results of two exemplary invitations, consistent with the disclosed embodiments. To further understand and recognize the fulfilled functions and structural characteristics of the disclosed embodiments, below illustrates another application employing the disclosed embodiments is illustrated below.

Figure 15:
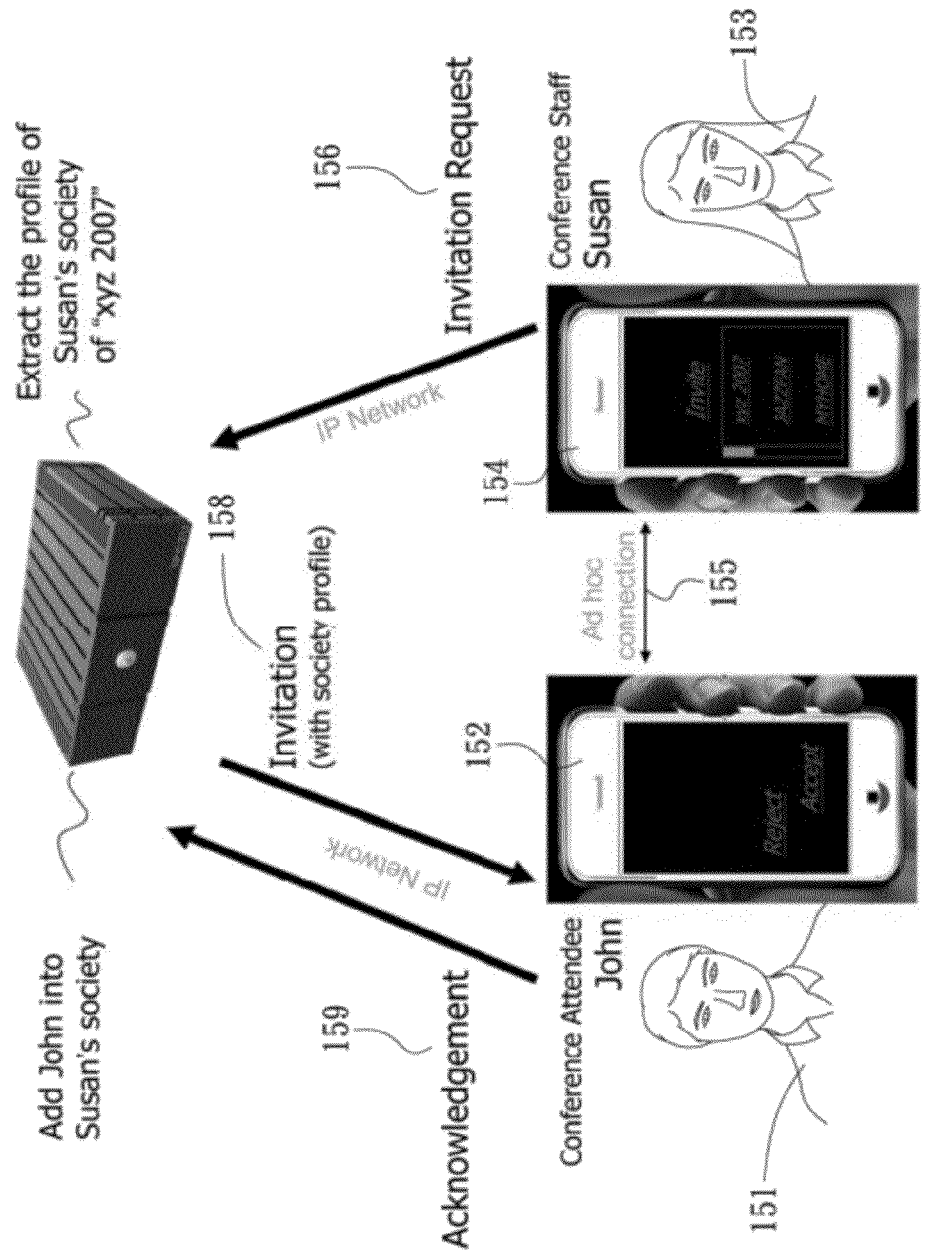
FIG. 15 illustrates graphical representation of two conference attendees associated with a server, consistent with the disclosed embodiments.

FIG. 15 illustrates a graphical representation of two conference attendees associated with a server, consistent with the disclosed embodiments. FIG. 15 is a schematic view showing how a conference attendee attends a conference and applies the disclosed embodiments to easily join the society established for the conference.

As seen in FIG. 15, a conference attendee John 151 now is attending a conference. He arrives at the conference and goes to the conference reception counter to meet with the conference staff for registration. During the registration, a member of the conference staff, Susan, uses her mobile device to make an ad hoc connection with John's mobile device in a manner consistent with the disclosed embodiments. During the ad hoc connection, John's mobile device and Susan's mobile device exchange their network address and their text-based token. Each mobile device displays the token it got on the screen of the mobile device, so that John and Susan can make certain who they are ad hoc connected with. After the exchange, each user of the mobile device can be the inviter mobile device to initiate an invitation as depicted in disclosed embodiments. In this example, Susan, as conference staff, initiates an invitation by using her mobile device to send the invitation request to the SNS, wherein the invitation request contains the network address of John's mobile device, the NID of Susan's mobile device, the SID of the conference society and the text-based token of Susan's mobile device and so on. After the invitation request is received by the SNS, the SNS checks the validity of the invitation request as noted herein. In this example, the invitation request was valid and then the SNS retrieved the profile of the conference society specified by the SID in the invitation request, generated an SNS token and sent an invitation to John's mobile device as specified by the invitee network address in the invitation request, wherein the invitation contains the SID of the conference society, the retrieved profile, the generated SNS token, and the text-based token of Susan's mobile device. After the invitation is received by John's mobile device, John's mobile device checks the validity of this invitation by checking whether the text-based or graphic-base token in the invitation is consistent with the previous token, i.e. the one received during the previous ad hoc connection. In this example, they are consistent and the profile in the invitation is displayed on the screen of John's mobile device. Then John's mobile device checks whether John wants to accept the invitation. In this example, John accepts the invitation and, consequently, John's mobile device sends an acknowledgement to the SNS, wherein the acknowledgement contains the NID of John's mobile device, the SNS token and the SID. After the acknowledgement is received and checked by the SNS, SNS associates the corresponding node of John's mobile device with the conference society according to the method/system disclosed herein.

Note that, the above example does not include some technical items related to security considerations such as encryption, decryption and the signatures of both mobile devices, since these technical items may be used consistent with the required security level. However, this example is sufficient for understanding and recognizing the functions and structural characteristics of the disclosed embodiments.

Figure 16:
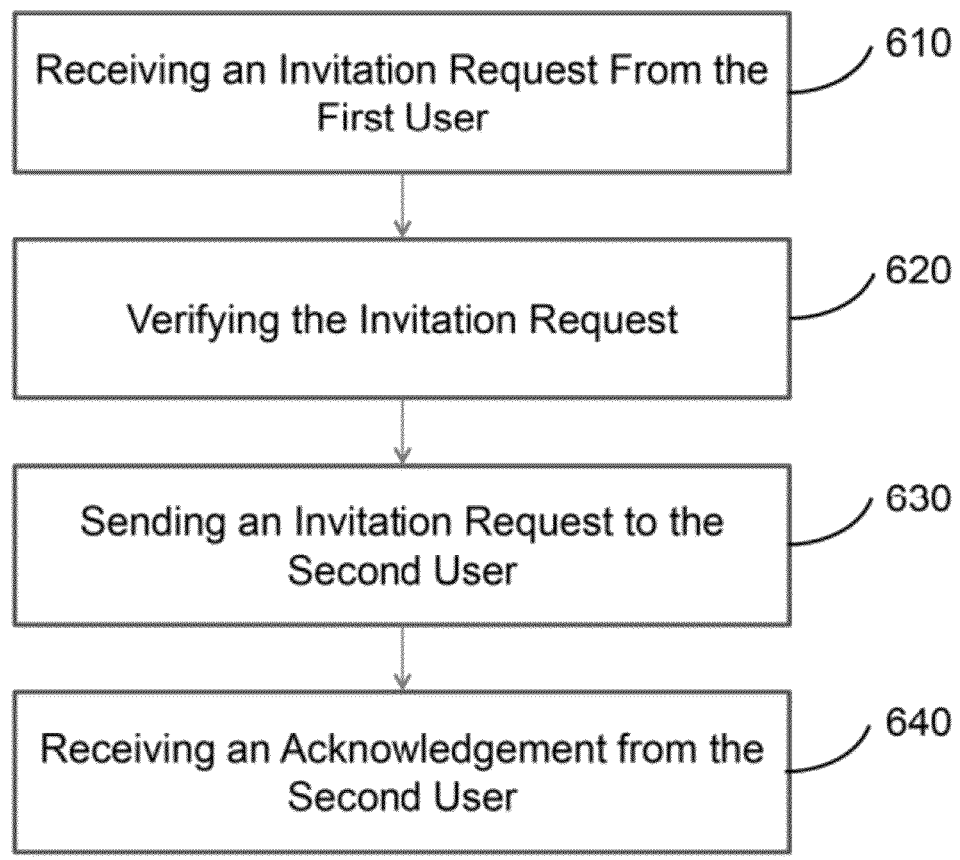
FIG. 16 illustrates an exemplary flowchart for an exemplary process of associating two users, consistent with the disclosed embodiments.

Methods for associating two users, with a first user using a first device and a second user using a second device, may be implemented in various manners as described above. FIG. 16 illustrates an exemplary flowchart for a process 600 of associating two users. The process may be managed by one or more servers or computers, such as a social network server, a verification server, or a computer properly configured. Process 600 may include receiving an invitation request from the first user (step 610), verifying the invitation request (step 620), sending an invitation to a second user (step 630), and receiving an acknowledgement from the second user (step 640). Consistent with the disclosed embodiments, the invitation request received in step 610 may be identified as directed to the second user and may include at least a device token associated with the first device, the second device, or both. The invitation request may also include an identification associated with either the second device or the second user, or both.

Step 620 in one embodiment may be performed by a verification server, which may verify the invitation request from the first user using one or more of a node identification associated with the first device, a society identification associated with the first user, and a network address associated with the first device. The verification server may be the social network server itself or a server or a computer configured to perform part or all of social-network-related functions. Step 630 may include sending the invitation to the second user after verifying the invitation request. In some embodiments, the invitation may include the device token and profile information associated with the first user. Step 640 may include receiving an acknowledgement from the second user for acknowledging an association between the first user and the second user.

Figure 17:
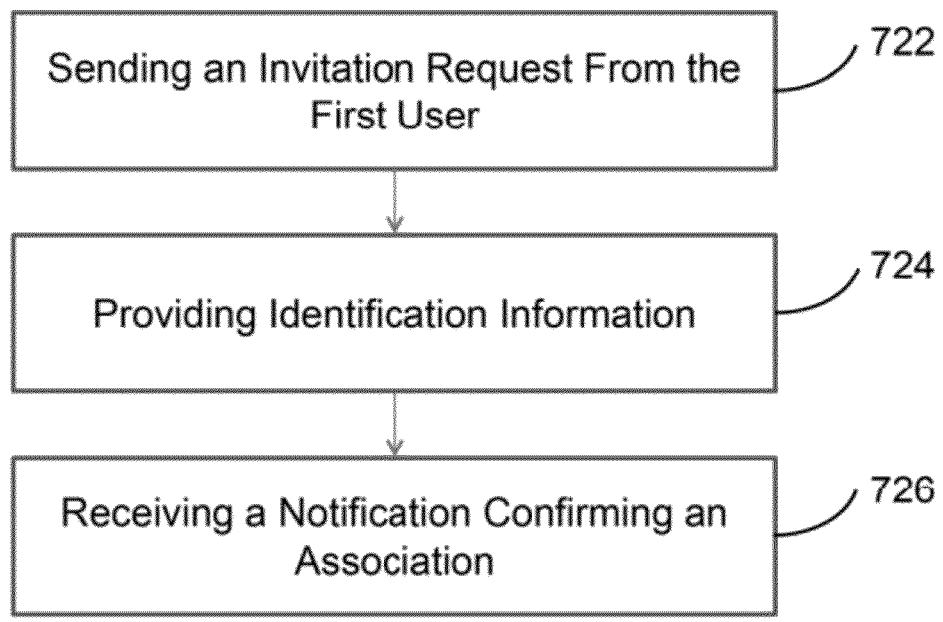
FIG. 17 illustrates an exemplary flowchart for an exemplary process for a first user, such as an inviter, to associate with a second user, consistent with the disclosed embodiments.
Figure 18:
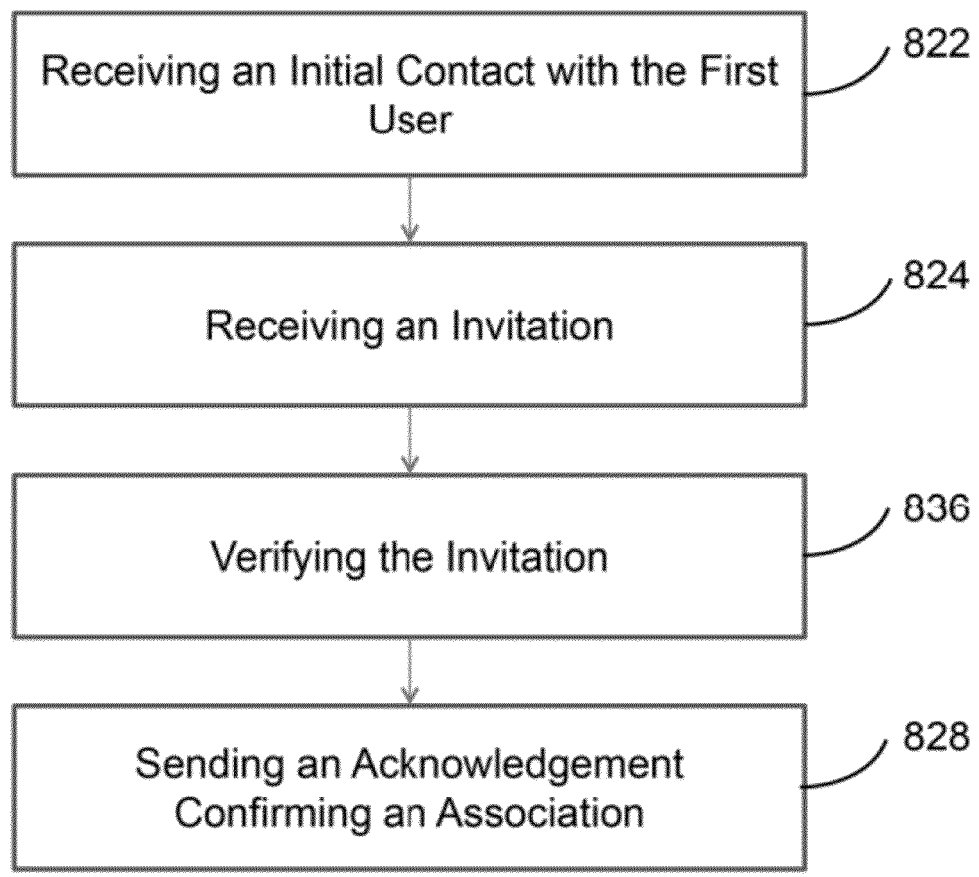
FIG. 18 illustrates an exemplary flowchart for an exemplary process for a second user, such as an invitee, to confirm its association with a first user, consistent with the disclosed embodiments.

Methods for associating two users also involve process or steps performed by a first user using a first device and a second user using a second device. For example, FIG. 17 illustrates an exemplary process for the first user, such as an inviter, using the first device to associate with the second user using the second device. The process 720, which may be performed by the first device, such as a mobile or a portable device, may include sending an invitation request from the first user (step 722), providing with the invitation request identification information (step 724), and receiving a notification confirming an association (step 726). As another example, FIG. 18 illustrates an exemplary process from the perspective of the second user, such as an invitee, using the second device, consistent with the disclosed embodiments. Process 820, may be performed by the second device, such as a mobile or a portable device, may include establishing an initial contact, such as an initial contact or local contact with the first user (step 822), receiving an invitation (step 824), verifying the invitation (step 826), and sending an acknowledgement confirming an association (step 828).

The invitation request of step 722 comprises at least a device token associated with at least one of the first and second devices and an identification associated with the second device, the second user or both. In some embodiments, the device token is associated with or generated from the second device, the second user or both. Therefore, the second device may verify the invitation in step 826 by comparing the device token contained in the invitation and the device token associated with or generated from the second device. In other embodiments, the device token is associated with or generated from the first device, the first user or both. Therefore, the second device may verify the invitation in step 826 by comparing the device token contained in the invitation and the device token acquired from the first device.

The identification information of step 724 is provided for determining the validity of the invitation request. It comprises one or more of: a node identification associated with the first device, a society identification associated with the first user, and a network address associated with the first device. In some embodiments, with the identification information, the verification server can check to see if the invitation request is sent from a valid user, and therefore the verification server can confirm the validity of the invitation request. In some embodiments, the notification may result from the second user's acknowledgment of the invitation sent to the second user, and the invitation may include a device token and profile information associated with the first user.

In some embodiments, the receiving of a notification completes an association between the user using the first device and a second user using a second device. In some embodiments, the notification is generated by a server which manages the database of the social network of the first user and is sent to the first device via the network. In other embodiments, the notification is sent from the second device to the first device by an established ad hoc network between the first device and the second device. In such embodiments, the notification may be generated by the second device or the server managing the database of the social network of the first user.

In some embodiments, the method or process, such as process 600, 720, or 820, is for socially associating the first or second users via a social network, and the device token may be sent by one of the first and second devices and received by the other of the first and second devices during an initial contact between the two first and second users. The device token provided by one of the two devices allows the other device to have the device token from the one device for security or verification purposes. The initial contact may include a contact made wirelessly between the first device and the second device, such as local (or remote/wireless) contact made through an IrDA connection, an RFID connection, a Bluetooth connection, a Wi-Fi connection, a short-range wireless connection, or other wireless/contactless connections.

Either or both of the first and the second devices may be a mobile device, a smart phone, a cell phone, a laptop, an ultratop, a personal computer, a personal digital assistant having wireless communication functions, a walkie-talkie, etc. Therefore, the process 600, 720 or 820 or part of the process may be implemented by software or by applications running on a mobile or portable device, such as an iPhone®, an Android® phone, or a smart phone. In one embodiment, the software or application may be stored in a medium, such as flash memory, random access memory, or other medium. In other words, a non-transitory, computer-readable storage medium may include instructions stored thereon, which, when executed by a processor, cause the processor to carry out a method for associating users, such as process 600, 720 or 820 as discussed above.

Further, various systems, such as computing systems, computers, mobile devices, and portable devices, may be configured to perform process 600, 720, or 820, with a system's processor carrying out operations, such as in conjunction with memory devices and input and output interfaces (which may be the same network or wireless interface), to provide the disclosed associations.

The identification associated with the second device, the second user, or both is for locating the second device, the second user, or both. It is an alternative to providing node identification which, though may be able to locate the second device, the second user, or both, is regarded more confidential and is not appropriate to be distributed by the second device via the initial contact. It may be various kinds of identifications, such as an IP (Internet Protocol) address associated with the second device, a telecommunication SIM (subscriber identity module) identification associated with the second device, a location identification associated with at least one of the second device and the second user, and a user identification associated with the second user. The identification may also be any other kind of identification that is appropriate to identify the second device, the second user, or both.

In some embodiments, the first user may be a member of a network society, and the network address associated with the first device may be one of an IP (Internet Protocol) address and a telecommunication SIM (subscriber identity module) identification. The invitation request is provided with some form of identification information to identify the first user or the first device, such as one or more of: the network address associated with the first device, the node identification associated with the first device, the society identification associated with the first user, a location identification associated with at least one of the first device and first user, and a user identification associated with the first user.

To provide some level of security or some form of identification, the invitation, such as an invitation sent from a server or an invitation received by the second device, may include one or more of: a network society token, the network address associated with the first device, the node identification associated with the first device, and the society identification associated with the first user. The acknowledgement, such as an acknowledgement sent by the second device or an acknowledgement received by a server, may include one or more of: the device token, a device token associated with the second device, a network society token provided by the invitation, the network address associated with the first device, the node identification associated with the first device, and the society identification associated with the first user.

In one embodiment, verifying the acknowledgement may be performed based on at least one of the device token, a device token associated with the second device, the network society token, the network address associated with the first device, the node identification associated with the first device, and the society identification associated with the first user. To provide additional protection or security, the invitation request, the invitation, and the acknowledgement may be encrypted with a public key, a device-dependent private key, or both.

It may be apparent to those skilled in the art that various modifications and variations can be made in the disclosed methods and systems without departing from the scope or spirit of the disclosed embodiments. Other embodiments may be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A method for associating a first user using a first device and a second user using a second device, the method comprising:
   transmitting a device token from one of the first device and the second device to the other on of the first device and the second device during an initial contact between the first and second users, wherein the initial contact is based on a first connection between the first and second devices;
   receiving an invitation request from the first user through a second connection, the invitation token associated with at least one of the first and second devices and an identification associated with at least one of the second device and the second user;
   verifying, by a verification server, the invitation request from the first user using a node identification associated with the first device, a society identification associated with the first user, and a network address associated with the first device;
   sending an invitation to the second user after verifying the invitation comprising the device token and profile information associated with the first user; and
   receiving an acknowledgement from the second user to acknowledge an association between the first user and the second user.

2. The method of claim 1, wherein the method for associating the first and second users comprises socially associating the first and second users via a social network.

3. The method of claim 2, wherein the first connection between the first device and the second device includes at least one of an IrDA connection, an RFID connection, a Bluetooth connection, Wi-Fi connection, and a short-range wireless connection.

4. The method of claim 1, where at least one of the first and the second devices comprises a mobile device, a smart phone, a cell phone, a laptop, an ultratop, a personal computer, a personal digital assistant having wireless communication functions, and a walkie-talkie.

5. The method of claim 1, wherein the identification associated with at least one of the second device and the second user comprises at least an IP (Internet Protocol) address associated with the second device, a telecommunication SIM (subscriber identity module) identification associated with the second device, a location identification associated with at least one of the second device and the second user, and a user identification associated with the second user.

6. The method of claim 1, wherein the first user is a member of a network society and the network address associated with the first device is one of an IP (Internet Protocol) address and a telecommunication SIM (subscriber identity module) identification.

7. The method of claim 1, wherein the invitation request further comprises at least one of the network address associated with the first device, the node identification associated with the first device, the society identification associated with the first user, a location identification associated with at least one of the first device and first user, and a user identification associated with the first user.

8. The method of claim 1, wherein the invitation further comprises at least one of a network society token, the network address associated with the first device, the node identification associated with the first device, and the society identification associated with the first user.

9. The method of claim 1, wherein the acknowledgement comprises at least one of the device token, a device token associated with the first device, the device token associated with the second device, a network society token provided by the invitation, the network address associated with the first device, the node identification associated with the first device, and the society identification associated with the first user.

10. The method of claim 9, wherein the method further comprises verifying the acknowledgement based on at least one of the device token associated with the first device, the device token associated with the second device, the network society token the network address associated with the first device, the node identification associated with the first device, and the society identification associated with the first user.

11. The method of claim 1, wherein at least one of the invitation request, the invitation, and the acknowledgement is encrypted with at least one of a public key and a device-dependent private key.

* * * * *